United States Patent [19]

Sugimura et al.

[11] Patent Number: 4,872,486

[45] Date of Patent: Oct. 10, 1989

[54] ACCUMULATOR HAVING INCLINED COMMUNICATION HOLES

[76] Inventors: Nobuyuki Sugimura; Kazuo Sugimura, both of 308, Mabase, Shimizu-shi, Shizuoka-ken, Japan

[21] Appl. No.: 174,361

[22] Filed: Mar. 28, 1988

[30] Foreign Application Priority Data

Apr. 7, 1987 [JP] Japan ............................... 62-052551
Sep. 16, 1987 [JP] Japan ............................... 62-141450

[51] Int. Cl.$^{4}$ ............................................. F16L 55/04

[52] U.S. Cl. ......................................... 138/30; 138/42

[58] Field of Search ........................ 138/30; 220/85 B; 251/61.1

[56] References Cited

U.S. PATENT DOCUMENTS

| | | | |
|---|---|---|---|
| 3,182,685 | 5/1965 | Mercier | 138/30 |
| 3,364,949 | 1/1968 | Sugimura | 138/30 |
| 3,483,892 | 12/1967 | Sugimura et al. | 251/61.1 |
| 4,600,035 | 7/1986 | Sugimura | 138/30 |
| 4,633,910 | 1/1987 | Sugimura | 138/30 |
| 4,705,077 | 11/1987 | Sugimura | 138/30 |

*Primary Examiner*—James E. Bryant, III

[57] ABSTRACT

An accumulator of the type that an interior of a vessel main body provided with a feed/discharge port or ports is partitioned into a gas chamber and a liquid chamber by means of a bladder, an inner tube having communication holes is disposed between the feed/discharge port or ports and the bladder, and valve bodies for opening and closing the communication holes are provided on the inside of the inner tube; the communication holes are inclined with respect to the axis of the vessel main body so that liquid passing through the communication holes may collide obliquely against the valve bodies.

10 Claims, 6 Drawing Sheets

ACCUMULATOR HAVING INCLINED COMMUNICATION HOLES

BACKGROUND OF THE INVENTION

The present invention relates to an accumulator adapted to be disposed in a hydraulic circuit, and more particularly to a bladder type accumulator for absorbing pulsation impacts.

In a bladder type accumulator, an interior of a vessel main body is partitioned into a gas chamber and a liquid chamber by means of a bladder formed of an elastic member, gas held at a predetermined pressure is filled in the gas chamber, while the liquid chamber is communicated with a hydraulic circuit, and liquid is made to flow into and out of the liquid chamber through communication holes in a liquid chamber wall (See U.S. Pat. No. 3,364,949).

In a heretofore known bladder type accumulator, since the communication holes are provided in perpendicular to a valve body, if a liquid pressure becomes high due to pressure variations in a hydraulic circuit, the liquid would collide against the surface of the valve body perpendicularly at a high speed and would apply a strong impact force to the valve body.

Consequently, the valve body would be damaged and eventually the bladder would be also damaged, resulting in that the accumulator cannot operate.

SUMMARY OF THE INVENTION

It is therefore one object of the present invention to provide an improved bladder type accumulator, in which an impact force applied to a valve body by the liquid flowing into the liquid chamber can be weakened to prevent the valve body from being damaged.

According to one feature of the present invention, there is provided a bladder type accumulator in which an interior of a vessel main body provided with a feed/discharge port or ports is partitioned into a gas chamber and a liquid chamber by means of a bladder, an inner tube having communication holes is disposed between the feed/discharge port or ports and the bladder, and valve bodies for opening and closing the communication holes are provided on the inside of the inner tube, improved in that the communication holes are inclined with respect to the axis of the vessel main body so that liquid passing through the communication holes may collide obliquely against the valve bodies.

DESCRIPTION OF THE PREFERRED EMBODIMENTS

Figure 1:
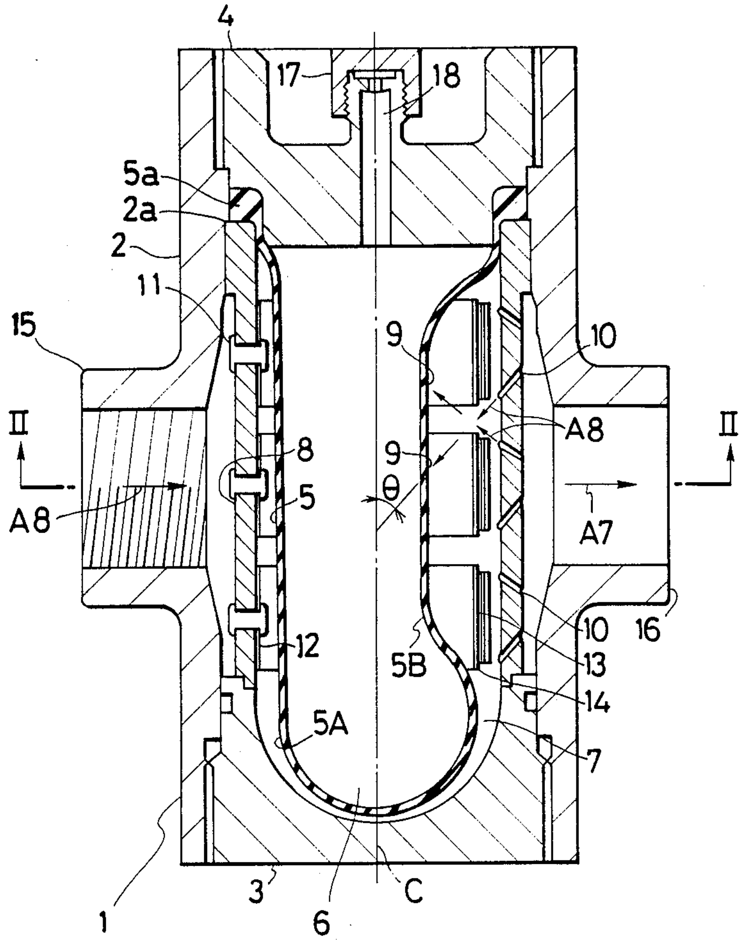
FIG. 1 is a longitudinal cross-section view of a bladder type accumulator according to a first preferred embodiment of the present invention.

In FIG. 1, reference numeral 1 designates a vessel main body consisting of an outer tube 2 of cylindrical shape having its opposite ends sealingly closed by side plates 3 and 4, respectively, and the interior of the vessel main body is partitioned into a gas chamber 6 and a liquid chamber 7 by means of a bladder 5 formed of an elastic member. Reference numeral 8 designates an inner tube that is coaxial with the outer tube 2 and the bladder 5, one end of the inner tube 8 is fixedly secured to the side plate 3, and the other end thereof is held in contact with a stopper 2*a* of the outer tube 2 and presses an ear 5*a* of the bladder 5 placed between the stopper 2*a* and the side plate 4 to fixedly hold the bladder 5.

In the wall of this inner tube 8 are formed a plurality of slit-like communication holes 10 inclined by an angle $\theta$ with respect to a center axis C of the vessel main body 1 in an axially symmetric manner, and in addition, on the inside of the inner tube 8 are disposed three valve bodies 12 of arcuate shape, respectively fixed at their center portions by means of pins 11.

Figure 2:
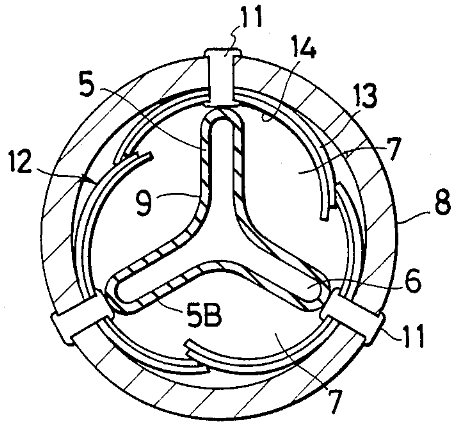
FIG. 2 is a partial transverse cross-section view of the same accumulator taken along line II—II in FIG. 1.
Figure 2A:
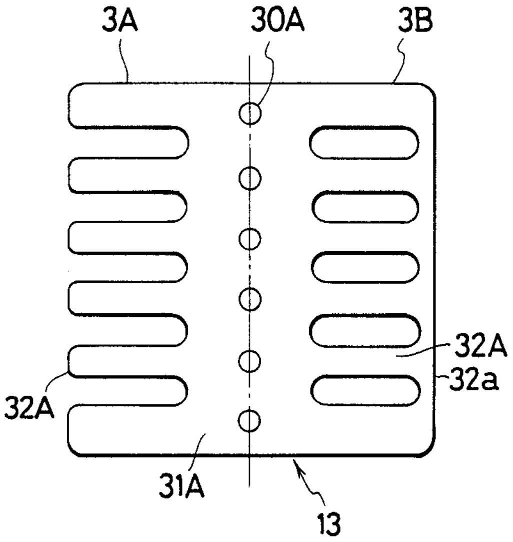
FIG. 2A is a developed view of a valve body incorporated in the accumulator shown in FIGS. 1 and 2.

This valve body 12 is composed of a spring valve or plate 13 and a protector 14 superposed on each other, the spring valve 13 on the outside is the so-called fish-bone type spring valve consisting of a backbone section 31A having a plurality of pin holes 30A formed therein and a plurality of branch-bone sections 32A for opening and closing the communication holes 10 as shown in the left half 3A of FIG. 2A, in which as compared to valve bodies in the prior art, the backbond section 31A is long and the branch bone sections 32A are formed more in number. The protector 14 is disposed on the inside of the valve body 12, that is, on the side faced to the bladder 5, and it consists of a Teflon ® sheet having a shape similar to but larger than the above-described spring valve 13 of fish-bone shape. The pin holes 30A in the spring valve 13 is formed to be a little larger in diameter than the pins 11, and when the pins 11 are fitted in the respective pin holes 30A, since movements in the axial direction as well as in the circumferential direction of the spring valve 13 is restrained due to the fact that the backbone section 31A of the spring valve 13 is fixed at a plurality of locations, displacement between the inner tube 8 and the spring valve 13 would become extremely small. Consequently, as almost no displacement would occur between the inner tube 8 and the spring valve 13, an amount of distortion of the spring valve 13 would become also extremely small. It is to be noted that the spring valve 13 could be modified in that the tip ends 32*a* of the respective branch-bone sections 32A are interconnected as shown in the right half 3B of FIG. 2A. If the tip ends 32*a* are interconnected as described above, a strength of resiliency of the spring valve 13 can be increased. When the liquid pressure becomes lower than the pressure in the gas chamber 6, the valve body 12 is pushed outwards by the bladder 5 and comes into contact with the inner surface of the inner tube 8, resulting in closure of the communication holes 10, but on the contrary, when the liquid pressure becomes higher than the pressure in the gas chamber 6, the valve body 12 is pushed towards the center axis of the vessel main body by high-pressure liquid flowing in through the communication holes 10, so that the valve body 12 separates from the communication holes 10, and is thus positioned in a region where it is not subjected to a high-speed flow of liquid.

Now description will be made on the operation of the above-described embodiment of the invention. After a feed port 15 and a discharge port 16 have been connected to a hydraulic circuit not shown, a cap 17 is removed, then gas is fed through a gas feed port 18 by making use of gas filling means not shown, and after the pressure in the gas chamber 6 has been grown up to a predetermined pressure, the cap 17 is fitted to the gas feed port 18.

At this moment, the bladder 5 expands towards the inner surface of the inner tube 8, and when the pressure in the hydraulic circuit takes a predetermined pressure, the bladder 5 takes the state shown at 5A in the upper half of FIG. 1.

If the liquid pressure in the hydraulic circuit decreases, then the bladder 5 expands, hence the liquid in the liquid chamber 7 is pushed and discharged through the communication holes 10 and the discharge port 16 into the hydraulic circuit in the direction of an arrow A7.

During this period, the bladder 5 moves in the radial directions towards the inner tube 8, and in the midway of the movement the bladder 5 comes into contact with the protector 14 of the valve body 12 and pushes the protector 14.

If the liquid pressure in the hydraulic circuit decreases further, the bladder 5 moves further in the same directions, comes into contact with the inner surface of the inner tube 8 and pushes the inner tube 8, but the bladder would never enter these communication holes 10 because the communication holes 10 are closed by the valve body 12.

On the contrary, if the liquid pressure in the hydraulic circuit increases, then the liquid flows at a high speed through the feed port 15 and the communication holes 10 into the liquid chamber 7 in the direction of arrows A8, thus the liquid separates the valve body 12 and the bladder 5 from the inner tube 8 and makes them move in the opposite direction to the above-described directions, and during this period, an increment of a pulsating pressure can be absorbed by the volume change of the bladder 5, that is, by the dynamic resilient effect of the bladder 5 and is reduced.

During this process, initially the valve body 12 is directly impacted by the liquid flowing into the liquid chamber 7 through the communication holes 10 and moves in the radial directions, so that the valve body 12 separates from the inner surface of the inner tube 8. However, since this liquid has its flowing directions restrained by the communication holes 10 and it collides against the valve body 12 in an inclined direction, a large impact force is not exerted upon the valve body 12.

Thereafter, since the valve body 12 moves to the range where the valve body 12 would not collide with the high-speed liquid having passed through the communication holes 10, the accident of the valve body 12 being damaged by such high-speed liquid, can be prevented.

The liquid passing through the communication holes 10 flows into the liquid chamber 7 in the direction of arrows A8 and comes into contact with a pressure receiving surface 9 of the bladder 5 making an angle $\theta$ therebetween, resulting in increase of the pressure in the liquid chamber 7, and thereby the bladder 5 is deformed into a star shape having three apexes. At this time, the bladder 5 takes the states shown at 5B in FIGS. 1 and 2.

In this case, owing to the fact that the pressure receiving surface 9 of the bladder 5 does not receive high-speed liquid flowing in the perpendicular direction as in the case with the prior art, the accident of the bladder 5 being damaged can be prevented.

In this connection, since adjacent communication holes 10 are formed in an axially symmetric manner, the high-speed liquid passing through the respective communication holes 10 would collide with each other before it collides against the bladder, and therefore, the flow speed of the high-speed liquid is attenuated and an impact force of the bladder 5 is reduced.

The present invention should be limited to the above-described embodiment but, for instance, the valve body and the bladder could be formed in the following manner. In the following, a number of modified embodiments of the present invention will be described with reference to FIGS. 3 to 9 of the accompanying drawings, in which component members designated by like reference numerals have the same name and functions.

Figure 3:
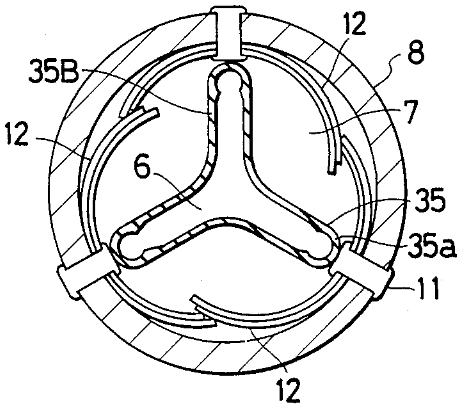
FIGS. 3 to 9, respectively, are partial transverse cross-section views similar to FIG. 2 of bladder type accumulators according to other preferred embodiments of the present invention.

As shown in FIG. 3, if thin wall portions 35*a* directed in the axial direction are formed in a bladder 35, upon deformation of the bladder 35 it is folded as bent at these thin wall portions 35*a*, and hence the bladder 35 can be deformed into a regular star shape 35B.

Figure 4:
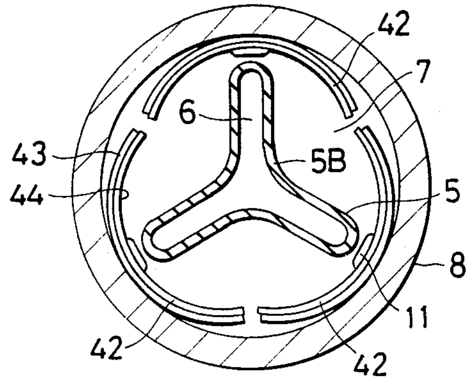

As shown in FIG. 4, a spring valve 43 of a valve body 42 could be formed shorter than a protector 44 and the adjacent valve bodies 42 could be spaced from each other.

Figure 5:
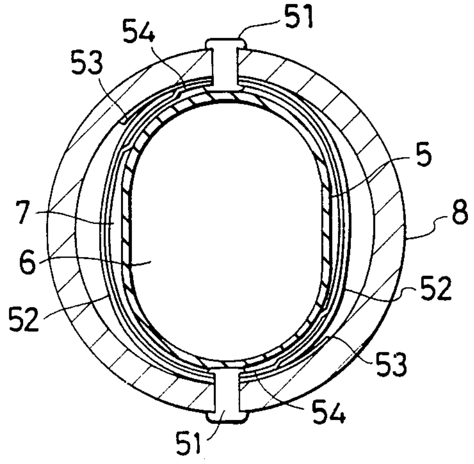

As shown in FIG. 5, one end portions of two valve bodies 52 each consisting of a spring valve 53 and a protector 54 superposed on each other could be fixedly secured to the inner tube 8 by means of pins 51, and the other end portions thereof could be made free.

Figure 6:
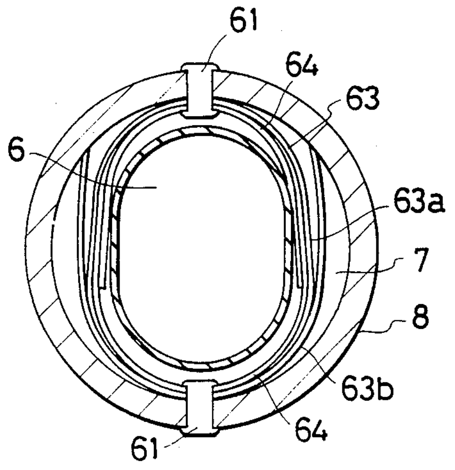

As shown in FIG. 6, modification could be made such that two valve bodies in which a spring valve 63 is made longer than a protector 64 are formed, the center portion of the valve bodies are fixedly secured to the inner tube 8 by means of pins 61, the both side portions of one spring valve 63*a* are inserted to the inside of the other spring valve 63*b*, and the other spring valve 63*b* is held in contact with the inner surface of the inner tube 8.

Figure 7:
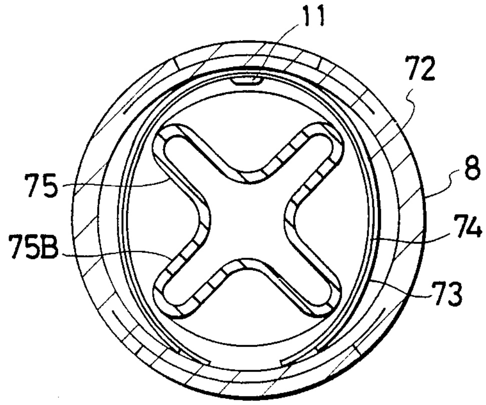

As shown in FIG. 7, modification could be made such that a center portion of a single valve body 72 in which a spring valve 73 is shorter than a protector 74, is fixedly secured to the inner tube 8 by means of a pin 11, and the opposite ends of the valve body 72 are held in contact with the inner surface of the inner tube 8. Reference numeral 75B designates the state of a bladder 75 where it has been pushed by liquid and deformed into a star shape having four apexes.

Figure 8:
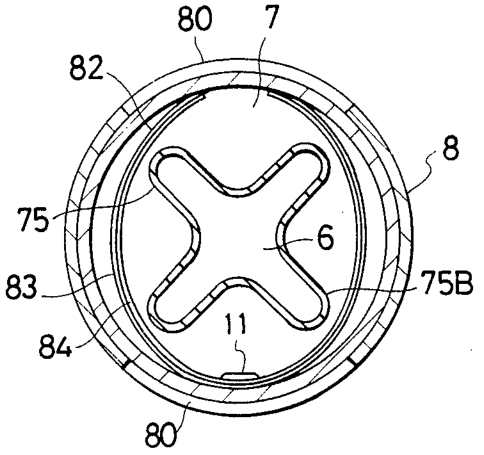

As shown in FIG. 8, a spring valve 83 and a protector 84 having the same length are superposed on each other to form a single valve body 82, the center portion of the valve body 82 is fixedly secured to the inner tube 8 by means of pins 11, and only the opposite ends of the spring valve 83 are held in contact with the inner surface of the inner tube 8. Reference numeral 80 designates communication holes.

Figure 9:
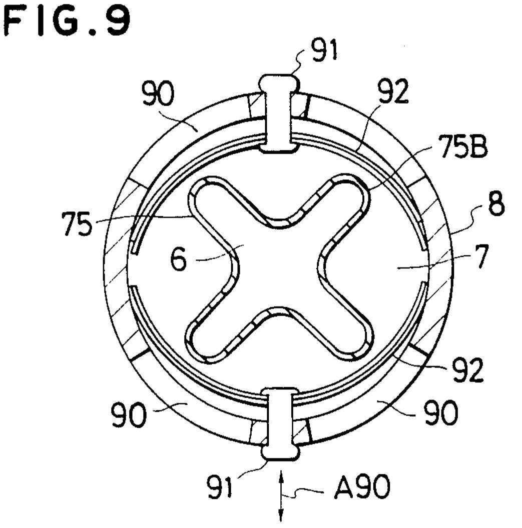

As shown in FIG. 9, modification could be made such that two valve bodies 92 are opposed to each other, the center portions of the valve bodies 92 are slidably jointed to the inner tube 8 by means of pins 91 to allow the pins 91 and the valve bodies 92 to be slid in the direction of arrows A90 by the liquid flowing through communication holes 90.

What is claimed is:

1. An accumulator having a vessel main body provided with a feed/discharge port or ports, a bladder for partitioning the interior of said vessel into a gas chamber and a liquid chamber, said bladder including a plurality of longitudinal thin wall portions directed in an axial direction for inducing deformation of the bladder into a regular star shape, an inner tube coaxial with the vessel main body and the bladder having communication holes disposed between said feed/discharge port or ports and said bladder, and a plurality of arcuate spring plates for opening and closing said communication holes disposed on the inside of said inner tube; characterized in that said communication holes are inclined with respect to an axis of said vessel main body so that streams of liquid passing through said communication holes may collide obliquely against said plates.

2. An accumulator having inclined communication holes as claimed in claim 1, characterized in that each of said communication holes is a slit.

3. An accumulator having inclined communication holes as claimed in claim 1, characterized in that said communication holes are provided in multiple.

4. An accumulator having inclined communication holes as claimed in claim 1, characterized in that adjacent ones of said communication holes are axially symmetric to each other so that said streams of liquid may collide with each other.

5. An accumulator having inclined communication holes as claimed in claim 1, further including a protector superposed on said spring plate.

6. An accumulator having inclined communication holes as claimed in claim 1, characterized in that said spring valve is a fish-bone type spring valve.

7. An accumulator having inclined communication holes as claimed in claim 6 wherein said fish-bone type spring valve includes branch-bones having tip end portions, characterized in that the tip end portions of said branch-bones are mutually connected.

8. An accumulator having inclined communication holes as claimed in claim 1 wherein said arcuate spring plate includes a backbone section, characterized in that said backbone section is supported by means of pins provided in said inner tube.

9. An accumulator having inclined communication holes as claimed in claim 8, characterized in that said pins are fixed.

10. An accumulator having inclined communication holes as claimed in claim 8, characterized in that said pins are slidable.

* * * * *